March 24, 1953   D. LOEFFLER   2,632,254
BOWLING BALL WITH GRIP MEASURING FACILITIES
Filed March 21, 1952
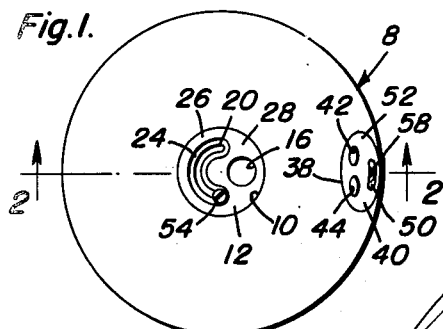
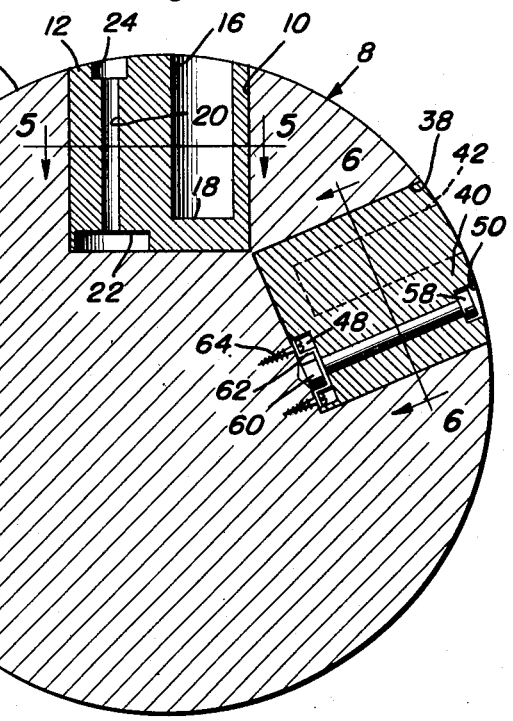
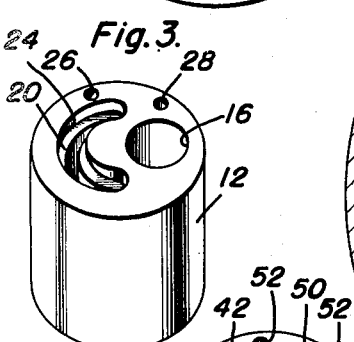
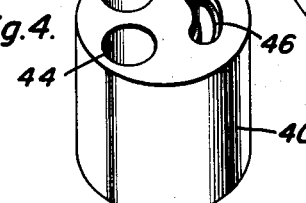
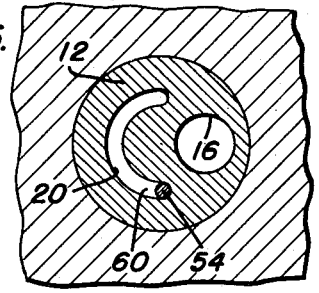
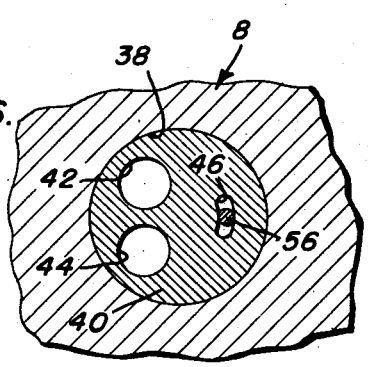
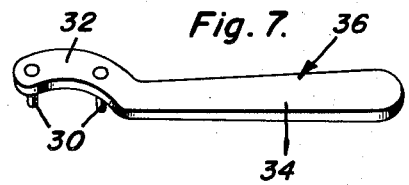
David Loeffler
INVENTOR.

Patented Mar. 24, 1953

2,632,254

UNITED STATES PATENT OFFICE 2,632,254

BOWLING BALL WITH GRIP MEASURING FACILITIES

David Loeffler, Marion, Tex.

Application March 21, 1952, Serial No. 277,839

2 Claims. (Cl. 33—174)

The present invention relates to a bowling ball which is structurally and functionally unique in that it is expressly constructed to provide practical and readily regulable facilities for ascertaining and measuring the span and over-all grip requirements of a given bowler, for example, an aspiring bowler about to purchase a custom made bowling ball for his own personal use.

Stated otherwise, the subject matter of the herein revealed invention appertains to a bowling ball of the stated character wherein the measurement indicating facilities embodied in the ball do not appreciably alter the weight and balance factors of the ball, whereby to permit the latter to be repeatedly experimented with on the basis of trial and error use on an actual alley with the result that the final adjustments of the measuring facilities enable the user to utilize the over-all ball as a pattern or gauge supplying measurements and reference data necessary for use in producing and perfecting a custom made bowling ball with thumb and finger holes which are correct as to size and relative spacing.

One phase of the invention has to do, more specifically speaking, with a simple rotatable cylindrical plug fitting snugly but rotatably in a correspondingly shaped socket which is bored or otherwise formed in the ball and which opens through the peripheral surface of the ball, whereby to permit the use of a multiplicity of interchangeable plugs each with a bored finger hole of prescribed diameter.

Another object, structurally speaking, is to provide a socketed bowling ball for the purposes stated with a rotatable plug fitting in the socket and with the plug having either a finger hole or a thumb hole, and a simple readily accessible bolt and nut means coacting respectively with the socket and plug, said means allowing the position of the plug to be varied, finally established and then fixed to provide required measuring data.

Stated somewhat more explicitly the concept, more informatively given, has to do with a try-out and measurement taking ball of a standard type having a first radial socket and a second radial socket in predetermined axial relation to said first socket, said sockets being cylindrical in cross-section and each socket being of uniform diameter from end to end, a cylindrical plug fitting snugly but rotatably in said first socket and having an eccentric thumb hole therein, a second cylindrical plug fitting snugly but rotatably in said second socket and provided with at least one finger hole, said thumb and finger holes each being of prescribed diameters suitable to the thumb and finger size requirements of the user, and means accessible from the peripheral surface of the ball for clamping said plugs against rotation and therefore in relatively fixed positions in their sockets, whereby to establish the specially needed relative spatial positions of said finger hole in respect to said thumb hole.

In carrying out a preferred embodiment of the invention, each turnable or rotary plug has an off center arcuate slot passing therethrough. A nut is anchored in the bottom socket in the ball to accommodate the screw threaded end of a bolt. The bolt is passed through the slot in the plug and is adjustably connected with the anchored nut. The head of the bolt is accessible but is located in a countergroove so that the head does not project or in any manner interfere with the reliable use of the ball on an alley.

Other objects, features and advantages will become more readily apparent from the following description and the accompanying sheet of illustrative drawings.

In the accompanying sheet of illustrative drawings, wherein like numerals are employed to designate like parts throughout the views:

Figure 1 is a top plan view of a bowling ball having measurement providing and taking facilities constructed in accordance with the principles of the present invention;

Figure 2 is an enlarged section taken on the plane of the line 2—2 of Figure 1 looking in the direction of the arrows;

Figure 3 is a perspective view of one plug, the one with a thumb hole therein;

Figure 4 is a perspective view of the second plug, the one with the finger holes therein;

Figure 5 is a fragmentary cross section taken on the plane of the line 5—5 of Figure 2 looking in the direction of the arrows;

Figure 6 is a similar section on the line 6—6 of Figure 2 looking in the direction of the arrows; and, Figure 7 is a perspective view of a plug turning or adjusting wrench.

Briefly and broadly, a general study of the various views of the drawings will show that the subject matter is actually quite simple in that two sockets are provided in the ball, plugs mounted in each, the plugs are bolted in the sockets.

More specifically, the ball itself is a regulation type bowling ball 8 except that it is altered to modify and to include the features of this invention.

One socket or recess is denoted by the numeral 10 and this serves to accommodate a companion socket, said operating connection embodying a nut anchored in said socket.

2. For trial and error use in sizing and correctly spacing thumb and finger holes to meet the maximum and minimum span and attending grip requirements of an aspiring bowler about to purchase a custom made bowling ball for his personal use; a standard type bowling ball for trial bowling purposes having at least one radial cylindrical socket formed therein and opening through the peripheral surface of the ball, a single insertable and removable cylindrical plug fitted in and filling said socket, the outer end of said plug being convex and conforming with the convexity of the cooperating spherical surface of the ball, said plug having an eccentrically disposed socket bored therein and opening at its outer end through the corresponding end of the plug and terminating at its inner end short of the bottom of the plug, said plug having an eccentrically disposed arcuate slot therein passing completely through the opposite inner and outer ends of the plug, the inner and outer end portions of said slot being counter-recessed to provide clearance pockets, a bolt accommodating nut, means saddling and fixedly mounting said nut in the bottom portion of said socket, said nut and saddling means projecting into the clearance pocket at the inner end of the slot, a bolt passing through said slot and having a screw-threaded inner end in operating connection with said nut, the outer end of the bolt having a head situated in the outer clearance pocket.

DAVID LOEFFLER.

REFERENCES CITED

The following references are of record in the file of this patent:

UNITED STATES PATENTS

| Number | Name | Date |
| --- | --- | --- |
| 75,872 | Davison | Mar. 24, 1868 |
| 533,011 | Huntoon | Jan. 22, 1895 |
| 1,051,531 | Whipple | Jan. 28, 1913 |
| 1,080,307 | Sondheimer | Dec. 2, 1913 |
| 1,157,817 | Stendner | Oct. 26, 1915 |
| 2,207,403 | Hinkley, Sr. | July 9, 1940 |
| 2,393,908 | Hubbard | Jan. 29, 1946 |
| 2,436,392 | Leshner | Feb. 24, 1948 |
| 2,566,511 | Bassi | Sept. 4, 1951 |

FOREIGN PATENTS

| Number | Country | Date |
| --- | --- | --- |
| 363,869 | Germany | Dec. 6, 1922 |